(12) United States Patent
Bacarella et al.

(10) Patent No.: US 7,274,830 B2
(45) Date of Patent: Sep. 25, 2007

(54) SYSTEM FOR MULTI-SENSOR IMAGE FUSION

(75) Inventors: Antonio V. Bacarella, Irving, TX (US); Timothy E. Ostromek, Richardson, TX (US); Timothy B. Hogan, Irving, TX (US); Jeffrey C. Short, Plano, TX (US); Gabriel H. Denk, Plano, TX (US); Robert F. Lund, Plano, TX (US)

(73) Assignee: Litton Systems, Inc., Los Angeles, CA (US)

( * ) Notice: Subject to any disclaimer, the term of this patent is extended or adjusted under 35 U.S.C. 154(b) by 688 days.

(21) Appl. No.: 10/250,196

(22) Filed: Jun. 11, 2003

(65) Prior Publication Data

US 2003/0231804 A1    Dec. 18, 2003

Related U.S. Application Data

(60) Provisional application No. 60/319,307, filed on Jun. 12, 2002.

(51) Int. Cl.
*G06K 9/36* (2006.01)

(52) U.S. Cl. ............... 382/276; 382/284; 382/294; 358/540; 358/450; 358/3.23

(58) Field of Classification Search ............. 382/274, 382/282, 284, 294, 261, 275; 358/3.26, 3.27, 358/540, 450, 3.23, 1.2
See application file for complete search history.

(56) References Cited

U.S. PATENT DOCUMENTS

| 4,463,252 | A |   | 7/1984  | Brennan et al.    | 250/214 VT |
| 4,602,861 | A |   | 7/1986  | Taniguchi et al.  | 396/81     |
| 4,679,068 | A |   | 7/1987  | Lillquist et al.  | 348/33     |
| 4,751,571 | A |   | 6/1988  | Lillquist         | 348/164    |
| 4,873,537 | A | * | 10/1989 | Ohta              | 347/252    |
| 5,035,472 | A |   | 7/1991  | Hansen            | 359/350    |
| 5,079,115 | A | * | 1/1992  | Takashima et al.  | 430/45     |
| 5,237,402 | A | * | 8/1993  | Deshon et al.     | 358/520    |
| 5,268,570 | A |   | 12/1993 | Kim               | 250/214 VT |
| 5,378,640 | A |   | 1/1995  | Kim               | 438/20     |
| 5,418,618 | A | * | 5/1995  | Kagawa et al.     | 358/3.23   |
| 5,453,840 | A |   | 9/1995  | Parker et al.     | 356/400    |
| 5,477,317 | A | * | 12/1995 | Edmunds et al.    | 399/39     |
| 5,557,451 | A |   | 9/1996  | Copenhaver et al. | 359/350    |
| H001599   | H |   | 10/1996 | Task et al.       | 348/33     |
| 5,602,606 | A | * | 2/1997  | Yazawa            | 396/435    |
| 5,602,934 | A | * | 2/1997  | Li et al.         | 382/128    |
| 5,657,416 | A | * | 8/1997  | Boon              | 386/109    |
| 5,724,456 | A | * | 3/1998  | Boyack et al.     | 382/274    |
| 5,729,010 | A |   | 3/1998  | Pinkus et al.     | 250/214 VT |

(Continued)

FOREIGN PATENT DOCUMENTS

WO    WO 01/72033 A1    9/2001

*Primary Examiner*—Yosef Kassa
(74) *Attorney, Agent, or Firm*—Marsteller & Associates, P.C.

(57) ABSTRACT

A method and system for fusing image data includes an electronic circuit (L) for synchronizing image frames. An adaptive lookup table unit (302a, 302b) receives the image frame data sets and applies correction factors to individual pixels. The size of an image is then scaled or otherwise manipulated as desired by data formatting processors (312a and 312b). Multiple images communicated within parallel circuit branches (P1 and P2) are aligned and registered together with sub-pixel resolution.

18 Claims, 4 Drawing Sheets

U.S. PATENT DOCUMENTS

| | | | |
|---|---|---|---|
| 5,729,376 A | 3/1998 | Hall et al. | 359/366 |
| 5,910,816 A | 6/1999 | Fontenot et al. | 348/65 |
| 6,075,891 A * | 6/2000 | Burman | 382/191 |
| 6,097,430 A | 8/2000 | Komiya et al. | 348/218 |
| 6,121,612 A | 9/2000 | Sinor et al. | 250/330 |
| 6,211,911 B1 * | 4/2001 | Komiya et al. | 348/218.1 |
| 6,266,086 B1 | 7/2001 | Okada et al. | 348/218 |
| 6,310,546 B1 * | 10/2001 | Seta | 340/507 |
| 6,430,363 B2 * | 8/2002 | Sasaki et al. | 386/112 |
| 6,437,491 B1 | 8/2002 | Estrera et al. | 313/103 CM |
| 6,560,029 B1 | 5/2003 | Dobbie et al. | 359/631 |
| 6,570,147 B2 | 5/2003 | Smith | 250/214 VT |
| 6,603,877 B1 * | 8/2003 | Bishop | 382/165 |
| 6,870,567 B2 * | 3/2005 | Funston et al. | 348/333.04 |
| 2003/0066951 A1 | 4/2003 | Benz et al. | 250/214 VT |

* cited by examiner

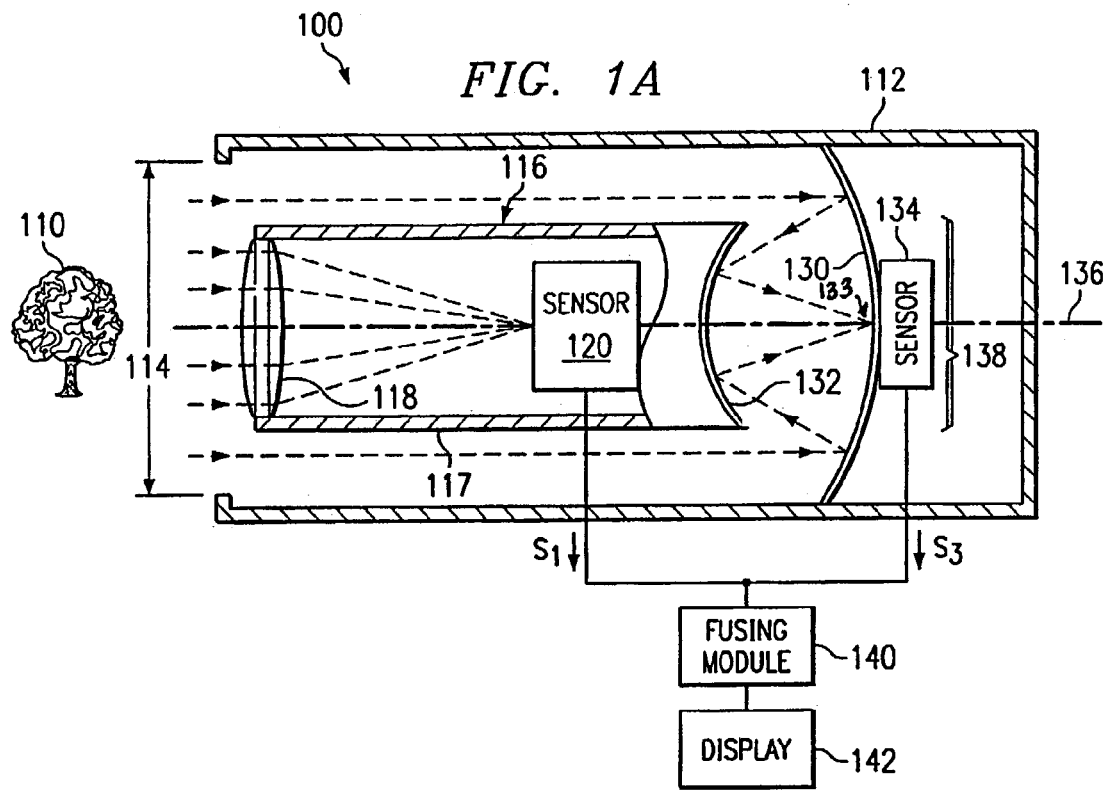
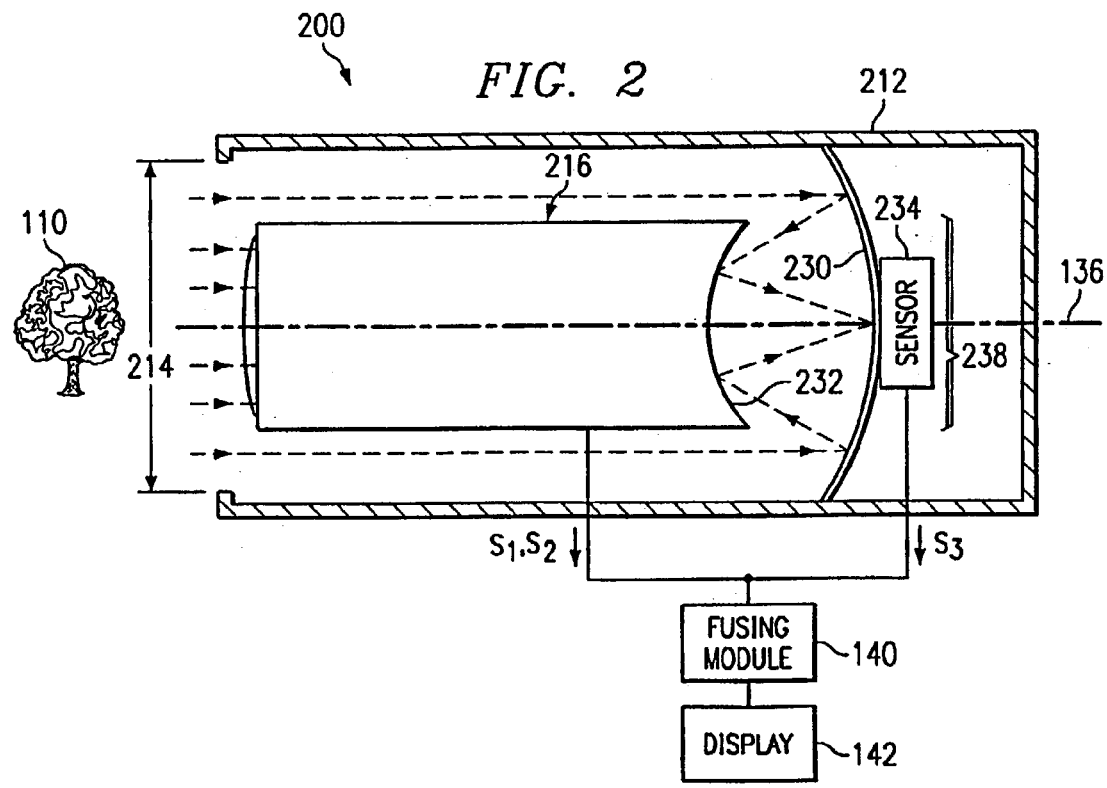

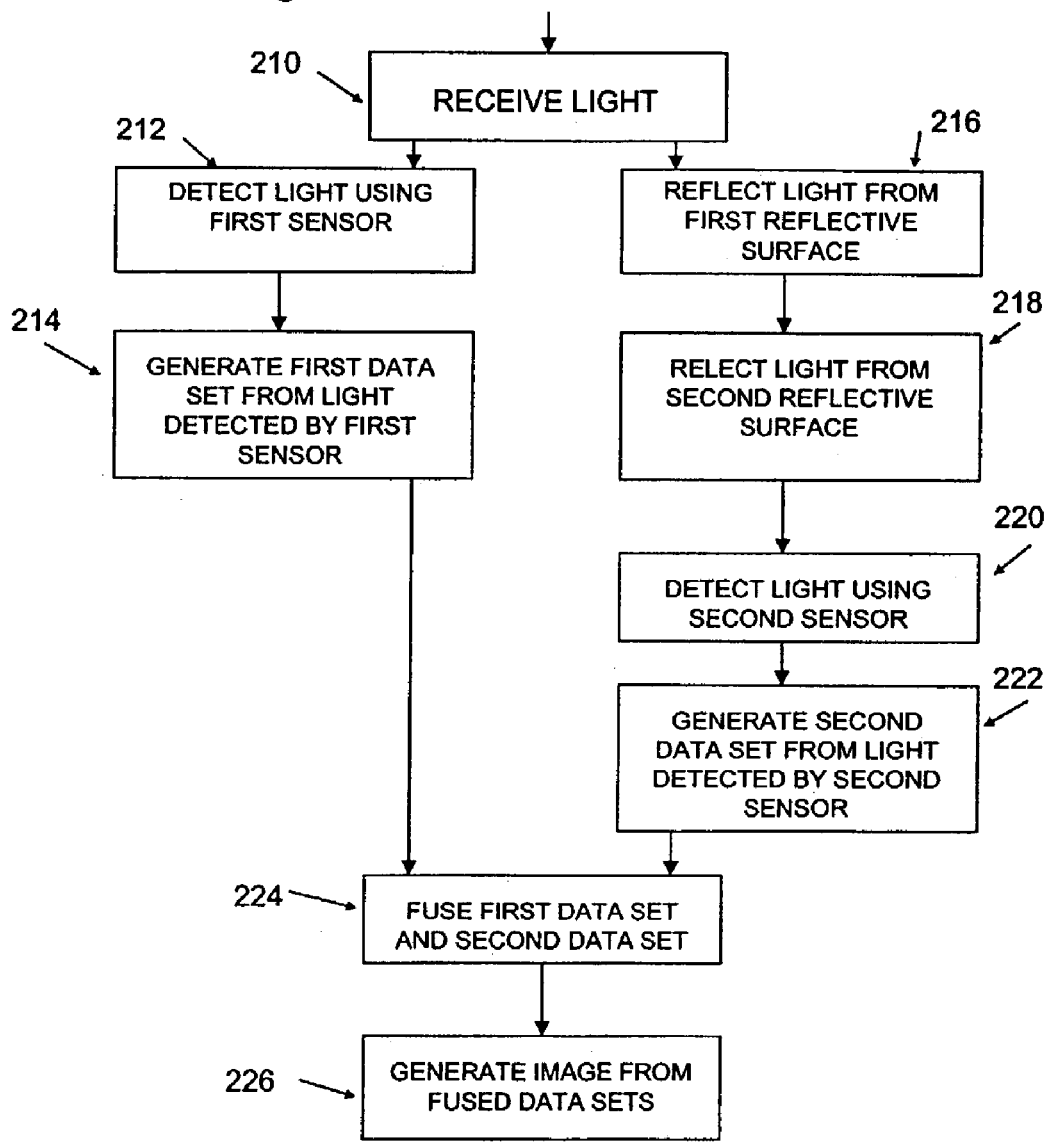

US 7,274,830 B2

SYSTEM FOR MULTI-SENSOR IMAGE FUSION

CROSS REFERENCE TO RELATED APPLICATIONS

This application claims the benefit of U.S. Provisional Application Ser. No. 60/319,307, filed Jun. 12, 2002, entitled SYSTEM FOR MULTI-SENSOR IMAGE FUSION.

BACKGROUND OF INVENTION

1. Technical Field

This invention relates generally to the field of imaging systems and more specifically to a method and system for fusing image data from multiple sources.

2. Background Art

Multiple sensor imaging systems generate an image of an object by fusing data that is collected using multiple sensors. Gathering image data using multiple sensors, however, has posed challenges. In some systems, the sensors detect light received from separate apertures. Data generated from light from separate apertures, however, describe different points of view of an object that need to be reconciled in order to fuse the data into a single image. Additionally, using separate apertures for different sensors may increase the bulk of an imaging system.

In other systems, light from an aperture is split into components before entering the sensors. Reflective and refractive elements are typically used to direct the light to different sensors. For example, the system described in U.S. Pat. No. 5,729,376 to Hall et al. includes multiple reflective and refractive elements such as a lens that reflects light towards one sensor and refracts light towards another sensor. Each individual sensor, however, detects only a component of light, for example, only specific wavelengths of light, and thus cannot generate image data from the full spectrum. Additionally, multiple reflective and refractive elements may add to the bulk and weight of an imaging system. Consequently, gathering image data from multiple sensors has posed challenges for the design of imaging systems.

While the above cited references introduce and disclose a number of noteworthy advances and technological improvements within the art, none completely fulfills the specific objectives achieved by this invention.

SUMMARY OF INVENTION

While known approaches have provided improvements over prior approaches, the challenges in the field of imaging systems have continued to increase with demands for more and better techniques having greater effectiveness. Therefore, a need has arisen for new methods and systems for gathering image data using multiple sensors.

In accordance with the present invention, a method and system for adaptively fusing a plurality of images, such as video or one or more still images, from a plurality of sources are provided that substantially eliminate or reduce the disadvantages and problems associated with previously disclosed systems and methods.

The method and system for fusing image data includes synchronizing image frames. An adaptive lookup table is used to apply correction factors to individual pixels in an image. The size of an image is then scaled. Multiple images are aligned and registered together with sub-pixel resolution.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIGS. 1A and 1B illustrate one embodiment of a system for gathering image data.

FIG. 2 illustrates one embodiment of a system for gathering image data that includes three or more sensors.

FIG. 3 is a flowchart demonstrating one embodiment of a method that may be used with the system of FIG. 1.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1B:
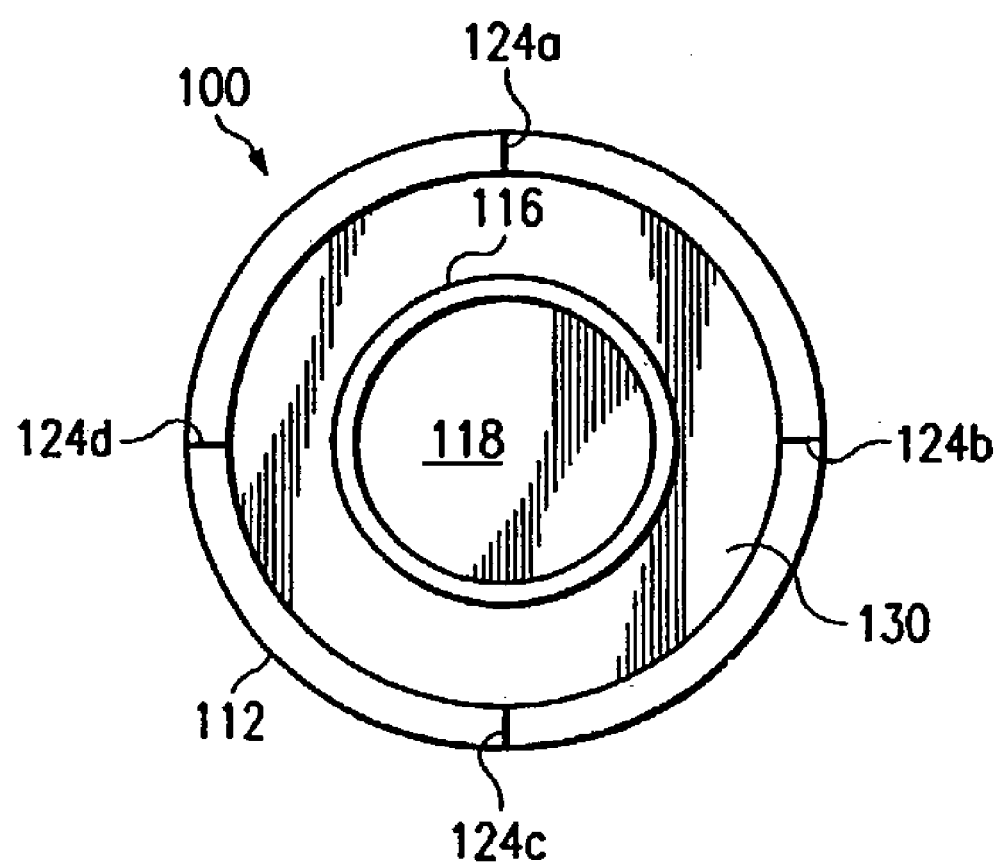

FIG. 1A illustrates a side view of one embodiment of a system 100 for gathering image data. System 100 receives light reflected from an object 110 and gathers information from the light to generate an image of object 110 on a display 142. System 100 may include an outer casing 112 having an aperture 114 through which light enters. Outer casing 112 may have any suitable shape such as a cylinder having a diameter in the range of 8-12 cm, for example, approximately 10 cm, and a length in the range of 12-15 cm, for example, approximately 14 cm. System 100 may also include an inner assembly 116 coupled to outer casing 112 with braces 124 as illustrated in FIG. 1B. FIG. 1B illustrates a front view of inner assembly 116 coupled to casing 112 with braces 124.

Referring to FIG. 1A, inner assembly 116 may include optics 118 and a sensor 120, each of which may be coupled to an inner casing 117. Inner casing 117 may have any suitable shape such as a cylinder having a diameter in the range of 3 to 6 cm, for example, approximately 4.5 cm, and a length in the range of 7 to 10 cm, for example, approximately 8 cm in length. Optics 118 focuses light reflected from object 110 onto sensor 120. Optics 118 may include, for example, a lens comprising glass or polymer having a radius in the range of 3 to 5 cm, for example, approximately 4 cm, and a focal length in the range of 20-22 mm, for example, approximately 22 mm. Optics 118, however, may include any suitable optical element or configuration of optical elements for focusing light from object 110 onto sensor 120.

Sensor 120 detects the light reflected from object 110 directly through aperture 114, that is, through an uninterrupted pathway. Sensor 120 may be placed such that sensor 120 receives light generally in a direction that light travels from object 110 to aperture 114. Sensor 120 may detect certain types of energy, for example, infrared energy, of the light. Sensor 120 may enhance certain features of light such as, for example, an image intensifier sensor. Sensor 120, however, may comprise any suitable sensor, for example, a long wave infrared sensor, a low light level charge coupled device (LLLCCD), or a complementary metal-oxide semiconductor (CMOS) sensor.

Sensor 120 generates sensor data set S1 in response to the received light. Sensor data set S1 may include values assigned to pixels corresponding to points of light, where the values represent image information such as brightness or color associated with the points of light. Sensor 120 transmits sensor data set S1 to a fusing module 140.

System 100 may also include an outer assembly 138 comprising reflective surfaces 130 and 132 and a sensor 134. Reflective surface 130 and sensor 134 may be coupled to outer casing 112, and reflective surface 132 may be coupled to inner casing 117. Any suitable configuration, however, may be used, for example, outer assembly 138 may be configured as a Schmidt-Cassegran catadioptric optical assembly, a diffractive optical system, or any combination of suitable configurations.

Reflective surface 130 receives light from object 110 through aperture 114 and reflects the received light. Reflective surface 130 may comprise a metallic or dichroic mirror having a diameter in the range of 8 to 10 cm, for example, approximately 9 cm and a focal length in the range of 24 to 26 mm, for example, approximately 25 mm. Reflective surface 130, however, may comprise any material and may have any shape suitable for receiving light through aperture 114 and reflecting light to reflective surface 132. Reflective surface 132 receives light from reflective surface 130 and reflects the received light. Reflective surface 132 may comprise a metallic or dichroic mirror having a diameter in the range of 7 to 10 cm, for example, approximately 8 cm and a focal length in the range of 24 to 26 cm, for example, approximately 25 mm. Reflective surface 132, however, may comprise any material and may have any shape suitable for receiving light from reflective surface 130 and reflecting light to a receptor area 133 of sensor 134.

Receptor area 133 of sensor 134 detects light reflected from reflective surface 132. Sensor 134 may include, for example, an infrared sensor or an image intensifier sensor. Sensor 134, however, may comprise any suitable sensor, for example, a long wave infrared sensor, a medium wave infrared sensor, a short wave infrared sensor, a low light level charge coupled device (LLLCCD), or a complementary metal-oxide semiconductor (CMOS) sensor. Sensor 134 generates sensor data set S2 in response to the received light. Sensor 134 may generate a different type of data set than that generated by sensor 120. For example, sensor 120 may include an infrared sensor that detects infrared energy of received light to generate a data set, and sensor 134 may include an image intensifier sensor that enhances certain features of received light to generate a different type of data set. Sensor data set S2 may include values assigned to pixels corresponding to points of light, where the values represent image information associated with the points of light. Sensor 134 transmits sensor data S2 to fusing module 140.

System 100 may have a central axis 136 located approximately along a light path from object 110 to receptor area 133 of sensor 134. Sensor 120 and sensor 134 may be substantially coaxial such that sensor 120 and sensor 134 receive light at a point approximately along central axis 136. Sensor 120 and sensor 134 may be configured such that the diameter of inner assembly 116 is less than the diameter of reflective surface 130, and inner assembly 116 is approximately centered over reflective surface 130 as illustrated in FIG. 1B. FIG. 1C illustrates a front view of system 100 where inner assembly 116 is approximately centered in front of reflective surface 130. In the illustrated embodiment, the configuration of sensors 120 and 134 allows sensors 120 and 134 to receive light from the same aperture with minimal reflective and refractive elements, providing for a compact imaging system.

Fusing module 140 receives sensor data S1 and S2 from sensors 120 and 134, respectively. Fusing module 140 fuses sensor data sets S1 and S2 to generate fused data. For example, fusing module 140 combines values of sensor data sets S1 and S2 for pixels corresponding to the same point of light to generate the fused data. Fusing module 140 may use any suitable process for fusing data sets S1 and S2, for example, digital imaging processing, optical overlay, or analog video processing.

In the illustrated embodiment, sensor 120 and sensor 134 detect light received through the same aperture 114, so both sensors 120 and 134 receive light describing the same point of view of object 110. As a result, fusing module 140 does not need to perform data processing to reconcile different points of view. Additionally, since minimal reflective and refractive elements are used, the light detected by sensors 120 and 134 undergoes few changes. As a result, fusing module 140 does not need to perform processing to compensate for changes due to multiple reflective and refractive elements.

Display 142 receives the fused data from fusing module 140, and generates an image of object 110 using the fused data. Display 142 may include any suitable system for displaying image data, such as an organic light-emitting diode (OLED), nematic liquid-crystal display (LCD), or field emitting display (FED), in panel display, eyepiece display, or near-to-eye display formats.

Although the illustrated embodiment shows two sensors 120 and 134, the system of the present invention may include any suitable number of sensors, as described in connection with FIG. 2.

FIG. 2 is a block diagram of one embodiment of a system 200 that includes three sensors for gathering image data. System 200 includes an inner assembly 216 coupled to an outer casing 212. Inner assembly may be substantially similar to system 100 of FIG. 1, which includes two sensors 120 and 134. Outer assembly 238 may be substantially similar to outer assembly 138. That is, reflective surfaces 230 and 232, which may be substantially similar to reflective surfaces 130 and 132, respectively, are coupled to inner assembly 216 and outer casing 212, respectively. Additionally, sensor 234, which may be substantially similar to sensor 134, is coupled to outer casing 212. Sensors 120, 134, and 234 may be substantially coaxial. Fusing module 140 is coupled to sensors 120, 134, and 234, and display 142 is coupled to fusing module 140.

In operation, system 200 receives light reflected from object 110. Inner assembly 216 may generate data sets S1 and S2 in a manner substantially similar to that of system 100 of FIG. 1. Sensor 234 receives light reflected from reflective surfaces 230 and 232 in a substantially similar matter to that of sensor 134 to generate dataset S3. Fusing module 140 receives datasets S1, S2 and S3 and fuses the datasets to generate fused data. Display 142 receives the fused data and generates an image from the fused data. Additional sensors may be added to system 200.

FIG. 3 is a flowchart illustrating one embodiment of a method for gathering image data using system 100 of FIG. 1. The method begins at step 210, where light reflected from object 110 is received by aperture 114. The reflected light includes image information that may be used to form an image of object 110. At step 212, sensor 120 detects the received light. Optics 118 may be used to focus the light onto sensor 120. Sensor 120 generates a data set S1 from the detected light and transmits data set S1 to fusing module 140 at step 214. Sensor 120 may, for example, detect infrared light reflected from object 110 and generate a data set S1 that describes the infrared light.

At step 216, reflective surface 130 receives light from object 110 and reflects the received light to reflective surface 132. Reflective surface 132 receives the reflected light and, in turn, reflects the received light to sensor 134 at step 218. At step 220, sensor 134 detects light reflected from reflective surface 132. Sensor 134 generates data set S2 from the received light at step 222. Sensor 134 may include an image intensifier sensor that enhances certain features of the light received from object 110, and may generate a data set that describes the enhanced features.

At step 224, fusing module 140 receives data sets S1 and S2 and fuses the received data sets to generate fused data. Fusing module 140 may, for example, combine values from data sets S1 and S2 for pixels corresponding to the same point of light. Display 142 receives the fused data and then displays an image of object 110 at step 226. After displaying the image, the method terminates.

Figure 4:
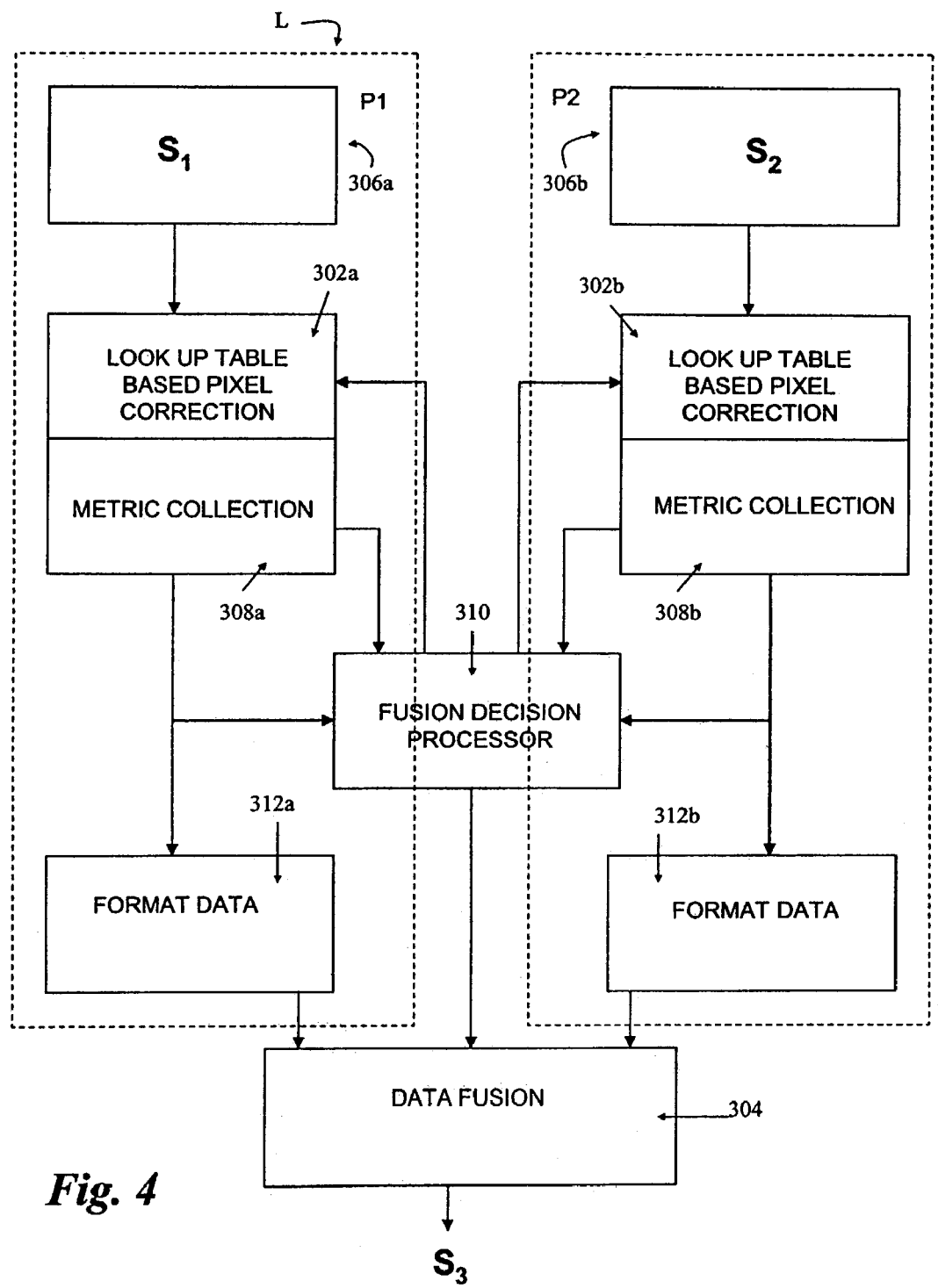
FIG. 4 is a flowchart demonstrating one embodiment of the present method for fusing a plurality of images.

The present method and system for fusing image data shown in FIG. 4 includes an electrical circuit L for synchronizing image frames representative of data collections from at least two data streams or sets S1 and S2. An adaptive lookup table component 302a and 302b is used to apply correction factors to individual pixels or data records or points in an image. The size of an image or data collection grouping is then scaled or formatted by the data formatting component or step 312a or 312b. Multiple images generally are aligned and registered together with sub-pixel resolution in the data fusion unit 304 of the circuit L.

Image Frame Synchronization.

A method for synchronizing multiple images from multiple sources together so that they can be later fused into a single image is further disclosed herein. As the multiple images are received or retrieved, selected image data records are separately clipped, extended, and scaled as needed to a common output resolution (or integer multiple of) or other common characteristic appropriate for producing the desired resulting output data stream S3 to be viewed or further processed.

The initially processed images are then communicated to and stored in separate buffers or electro-optical memory units. Two comparable buffer units or process steps 306a and 306b are shown buffering data sets S1 and S2, respectively, in parallel circuit branches P1 and P2 of circuit L. Two circuit branches P1 and P2 are shown by way of example in FIG. 4, although a plurality of branches may be designed into circuit L to accommodate a desired number of data records to be fused or processed together to form the output set S3.

Each buffer may be large enough or have the capacity to hold an entire image frame or hold partial images that are misaligned in time by a fixed delay. The processed images or selected data records are read from the buffers 306a and 306b in parallel and are eventually combined by a fusion multiplexer 304 as the data is sent to a storage device or a display device depicted schematically as an output set or signal S3 in FIG. 4.

Adaptive Lookup Table.

An adaptive lookup table 302a and 302b may be implemented to provide a fast, hardware efficient method for applying correction factors to individual pixels or selected data records in an image record. A correction factor stored within the correction circuit component or step 302a or 302b may be applied, which correction factor can include gamma correction, brightness adjustment, contrast adjustment, pixel bit-width conversion, an image fusion ratio, or the like.

As each pixel or data portion of an image is received, the pixel's value is generally electro-optically communicated or input to the lookup table as an address to table units 302a or 302b. The contents at the sent address are transmitted or used as one or more output datum points, and are used in the output image S3 in place of the input pixel values.

The lookup table 302a or 302b is desirably adaptively updated by an algorithm which is based on metrics of the current image data grouping, previous image metrics, other image source data, user preferences, system settings, and metrics from other image sources. Such metric collection is shown schematically in FIG. 4 as metric collection components 308a and 308b of circuit branches P1 and P2, respectively. The aforementioned algorithm may be implemented in hardware or in software.

A pixel bit-width conversion may also be accomplished by making the input bit width different from the output bit width. The output bit width may be made either larger or smaller than the input bit width, as desired for the specific system's needs for which the logic circuit L forms a part.

Image Scaling.

An optional method of scaling the size of an image at video frame rates is further disclosed that is computationally efficient and requires minimum resources to implement.

The present scaling method also provides a convenient point to decouple an incoming image pixel clock from a system pixel clock. This allows the scaling method to operate at a faster rate than the rate of the incoming pixel data stream. The primary advantage of the present method is to allow the scaled output resolution to be greater than the incoming resolution when operating in an interpolation mode.

Specifically, the first two or more scan lines of the incoming image preferably are each stored in a scan line memory buffer, such as collection components 308a and 308b or other electro-optical circuit element as chosen by the designer. Two lookup tables are preferably utilized to hold computation coefficients and pixel pointer indexes: a horizontal table, and a vertical table.

The table values may be pre-computed and loaded when requested. Alternatively, the table values could be computed in the background by an attached microprocessor 310 or other processing component. The table values may contain electro-optically stored information such as the starting pixel index, multiplication coefficients, and pixel index increment values. The scaling method may be implemented as a state machine that steps through the tables scan-line by scan-line. The coefficients in the tables are used to perform either a linear or decimation of the pixels pointed to by the table such as by format data processors 312a or 312b, and produce a new pixel value at the desired output resolution for output stream S3.

The present scaling method is further capable of scaling an image to a higher resolution or to a lower resolution than the input resolution. The scaling method herein is designed to provide sub-pixel scaling such that non-integer scaling factors can be used. The resolution is generally limited by the number of bits available in the electro-optical lookup tables and the number of bits used in the multiplication stages of the scalar component.

Image Alignment and Registration.

A present method for aligning and registering multiple image records together with sub-pixel resolution generally includes using the aforementioned scaling method to stretch or shift each of the output image data records in horizontal and vertical directions. The scaling factors and image shift offsets may be determined by a manual user calibration sequence or by an automatic calibration sequence.

An electronic imager (CMOS, CCD, etc) may be used to electronically sample an image record that is displayed on or by an image intensifier, which may form a part of the sensor units describe with regard to FIGS. 1A and 2. A horizontal and a vertical deflector coil may be placed on the intensifier tube. A pair of AC control signals, which signals are synchronized to an electronic imager frame rate, drive the deflector coils, so as to slightly move the image on the intensifier tube up/down or left/right by an amount equal to one-half, one-quarter, etc. of the size of a pixel in the electronic imager.

After the new position of the image on the tube stabilizes, the electronic imager would capture a new field. Several fields may be sampled with the image moved each time by a partial scan line height and a partial pixel width. The resulting captured fields can either be displayed as an interlaced output signal or combined into a single larger image that contains 2×, 4×, etc. the number of actual pixels in the sensor.

A second alternative embodiment uses deflector coils on a tube, which deflector coils could be used to affect an image alignment mechanism. An adjustable signal may then be driven into the deflection coils that would deflect the displayed or output image by a constant amount.

The foregoing disclosure and description of the invention are illustrative and explanatory thereof, and various changes in the size, shape and materials, as well as in the details of the illustrated construction may be made without departing from the spirit of the invention.

The invention claimed is:

1. A method for fusing image data from two or more data sets into an output data stream, the method including the steps of:
   synchronizing digitized image frame data records;
   using an adaptive lookup table to apply correction factors to individual pixels in an image to be processed for formatting the image; and
   aligning and registering multiple selected synchronized images together.

2. The method of claim 1 wherein a fusion decision processor aligns and registers the multiple synchronized images.

3. The method of claim 1 further including scaling the size of an image record that has been processed with the adaptive lookup table.

4. The method of claim 1 wherein individual data streams are formatted following look up table processing and before the multiple data streams are fused.

5. The method of claim 1 wherein the correction factors applied are selected from the group consisting of gamma correction, brightness adjustment, contrast adjustment, pixel bit-width conversion or image fusion ratio.

6. An image data set fusion system for producing an output data stream by fusing digitized image data records from two or more data sets comprising:
   a plurality of parallel circuit branches each of which branches receive a data stream to he processed;
   a data fusion processor component for controllably fusing image data records communicated from the parallel circuit branches; and
   at least one of the parallel circuit branches having a look up table correction processing module to receive an input data stream corresponding to the parallel circuit branch and to apply desired correction parameters to the input data stream for formatting the image.

7. The invention of claim 6 wherein the fusion decision processor aligns and registers the multiple synchronized images.

8. The invention of claim 6 further including scaling the size of an image record that has been processed with the adaptive lookup table.

9. The invention of claim 6 wherein the correction factors applied by the look up table correction processing module are selected from the group consisting of gamma correction, brightness adjustment, contrast adjustment, pixel bit-width conversion or image fusion ratio.

10. The invention of claim 6 wherein individual data streams are formatted following look up table processing and before the multiple data streams are fused.

11. A method for fusing image data from two or more data stream the method including the steps of:
    synchronizing digitized image frame data records;
    using an adaptive lookup table to apply correction factors to individual pixels in an image to be processed for formatting the image;
    formatting individual data streams following look up table processing and before the multiple data streams are fused; and
    aligning and registering multiple selected images together.

12. The method of claim 11 wherein a fusion decision processor aligns and registers the multiple synchronized images.

13. The method of claim 11 further including scaling the size of an image record that has been processed with the adaptive lookup table.

14. The method of claim ii wherein the correction factors applied are selected from the group consisting of gamma correction, brightness adjustment, contrast adjustment, pixel bit-width conversion or image fusion ratio.

15. An image data set fusion system for producing an output data stream by fusing digitized image data records from two or more data sets comprising:
    a plurality of parallel circuit branches each of which branches receive a data stream to be processed;
    a data fusion processor component for controllably fusing image data records communicated from the parallel circuit branches; and
    at least one of the parallel circuit branches having a look up table correction processing module to receive an input data stream corresponding to the parallel circuit branch and to apply desired correction parameters to the input data stream, and, individual data streams are formatting following look up table processing and before the multiple data streams for formatting the image are fused.

16. The invention of claim 15 wherein the fusion decision processor aligns and registers the multiple synchronized images.

17. The invention of claim 15 further including scaling the size of an image record that has been processed with the adaptive lookup table.

18. The invention of claim 15 wherein the correction factors applied by the look up table correction processing module are selected from the group consisting of gamma correction, brightness adjustment, contrast adjustment, pixel bit-width conversion or image fusion ratio.

* * * * *